(12) United States Patent
Yasuda

(10) Patent No.: US 6,567,716 B2
(45) Date of Patent: May 20, 2003

(54) SEMICONDUCTOR DEVICE PRODUCTION MANAGEMENT SYSTEM, AND SEMICONDUCTOR DEVICE PRODUCTION METHOD

(75) Inventor: Tsuneo Yasuda, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/910,826

(22) Filed: Jul. 24, 2001

(65) Prior Publication Data

US 2002/0103556 A1 Aug. 1, 2002

(30) Foreign Application Priority Data

Jan. 31, 2001 (JP) .................................. 2001-023178

(51) Int. Cl.[7] .............................................. G06F 19/00
(52) U.S. Cl. .................... 700/115; 700/114; 700/121; 700/109; 700/103
(58) Field of Search ................................. 700/121, 115, 700/116, 99–110, 225, 226; 438/14

(56) References Cited

U.S. PATENT DOCUMENTS

| | | | | |
|---|---|---|---|---|
| 4,974,166 A | * | 11/1990 | Maney et al. ............... | 235/375 |
| 5,443,346 A | * | 8/1995 | Murata et al. ............. | 414/222.13 |
| 5,694,325 A | * | 12/1997 | Fukuda et al. ............. | 700/121 |
| 6,078,845 A | * | 6/2000 | Friedman .................. | 438/166 |

FOREIGN PATENT DOCUMENTS

JP  6-183524  7/1994

\* cited by examiner

Primary Examiner—Leo Picard
Assistant Examiner—Michael D. Masinick
(74) Attorney, Agent, or Firm—McDermott, Will & Emery

(57) ABSTRACT

A cassette usage rule processing function 66 is used to store usage rules on cassettes for containing wafers. A process flow creation function 72 permits creation of reviewable process flows. A process flow check function 74 provides checks on whether the reviewable process flows comply with the cassette usage rules, and supplies only the conforming process flows to a production line. In each process, a processing condition display function 82 displays the applicable cassette usage rules for review by a line operator. If cassettes need to be changed before or after a process, a process start function 84 or a process end function 86 prompts the line operator to change the cassettes.

11 Claims, 20 Drawing Sheets

| RECORD NO. | EQP CD | PRO CD | INC AST | PRC AST | OUC AST | INC ASE | OUC ASE | TGR DUP | EGR DUP |
|---|---|---|---|---|---|---|---|---|---|
| 1 | ASH 01 | RRB 1 | B | B | B | B | A | — | ON |
| 2 | ASH 01 | RRA 1 | C | C | C | C | C | — | — |
| ------- | ------- | ------- | ------- | ------- | ------- | ------- | ------- | ------- | ------- |
| n | WET 01 | WEA 1 | B | — | A | B | A | ON | ON |
| ------- | ------- | ------- | ------- | ------- | ------- | ------- | ------- | ------- | ------- |

Fig. 5

| SYMBOLS | DESCRIPTIONS |
|---|---|
| EQPCD | Production equipment code, such as ASH01 representing a resist ashing device No.1. A plurality of records (a single row in a definition table is regarded as a record) may be assigned to a single EQPCD. |
| PROCD | Production process code, such as RRB1 representing a pre-wiring resist removal process. A plurality of PROCDs may be assigned to a single EQPCD. |
| INCAST | Carry-in cassette name |
| PRCAST | In-process cassette name |
| OUCAST | Carry-out cassette name |
| INCASE | Carry-in cassette name, subject to the same grade management as that of cassettes. |
| OUCASE | Carry-out cassette name, subject to the same grade management as that of cassettes. |
| TGRDUP | Cassette grade reverse flag. Whereas a carry-in cassette (INCAST) is usually equal to or higher than a carry-out cassette (OUCAST) in grade, a cassette cleaning process can reverse thier grades by rendering the out-cassette at least equal to the in-cassette in terms of grade. Such a process where cassette grades may be reversed has its TGRDUP flag turned on. |
| EGRDUP | Case grade reverse flag, handled in the same manner as TGRDUP. |

Fig. 6

| GRADES | CASSETTE NAMES | DEGREES OF CONTERMINATION |
|---|---|---|
| 1 | A | LOW |
| 2 | B | |
| 3 | C | |
| ⋮ | ⋮ | ⋮ |
| n | ⋮ | HIGH |

| PROCD | PROCESS NAMES | EQPCD | OUCAST | PROCESS START DATES | ... |
|---|---|---|---|---|---|
| ... | ... | ... | ... | ... | ... |
| CKS1 | CHECK SEM | SEM03 | B | OCTOBER 2000 | ... |
| WEZ3 | DIFFUSION PREPROCESSING | WET05 | A | OCTOBER 2000 | ... |
| WEP2 | LIGHT ETCHING | WET09 | B | OCTOBER 2000 | ... |
| DRC5 | TRENCH ETCHING | ETCH7 | B | OCTOBER 2000 | ... |
| ... | ... | ... | ... | ... | ... |

| OUC<br>AST | CANDIDATE 1 | CANDIDATE 2 | CANDIDATE 3 | . . . |
|---|---|---|---|---|
| B | [B, (B]) | — | — | — |
| A | ([B) (A]) [B, B] B | — | — | — |
| B | A [A, A] ([A) (B]) | — | — | — |
| B | ([B) B] | — | — | — |

Fig. 12

PROCESS-BY-PROCESS PROCESSING CONDITION DISPLAY SCREEN REFERENCED BY LINE OPERATOR

| PROCESS NAME | PRE-WIRING RESIST REMOVAL |
|---|---|
| PRODUCTION EQUIPMENT CODE | A S H 0 1 |
| CARRY-IN CASSETTE NAME | A |
| IN-PROCESS CASSETTE NAME | DEDICATED X |
| CARRY-OUT CASSETTE NAME | B |
| PROCESSING CONDITIONS: FOR 10 SEC. AT 100 C, ... | |

Fig. 13

EXAMPLE TO OF MESSAGE TO LINE OPERATOR

SWITCH TO CASSETTE A

| O K | CANCEL |

| GRADES | CASSETTE NAMES | DEGREES OF CONTAMINATION |
|---|---|---|
| −1 | DEDICATED CASSETTE Z | — |
| 1 | A | LOW |
| 2 | B | |
| 3 | C | |
| ⋮ | ⋮ | ⋮ |
| n | | HIGH |

Fig. 16

| GRADES | CASSETTE NAMES | DEGREES OF CONTERMINATION |
|---|---|---|
| −1 | TEMPORARILY DEDICATED CASSETTE Y | — |
| 1 | A | LOW |
| 2 | B | |
| 3 | C | |
| ⋮ | ⋮ | ⋮ |
| n | ⋮ | HIGH |

| PROCD | PROCESS NAMES | EQPCD | OUCAST | PROCESS START DATES | ... |
|---|---|---|---|---|---|
| ... | ... | ... | ... | ... | ... |
| WEP2 | LIGHT ETCHING | WET07 | A | OCTOBER 2000 | ... |
| OXA1 | FIELD OXIDATION | BAT02 | A | OCTOBER 2000 | ... |
| CKS3 | MONITOR FILM THICKNESS MEASUREMENT | CHK05 | A | OCTOBER 2000 | ... |
| OXA1 | GATE OXIDATION | BAT09 | A | OCTOBER 2000 | ... |
| RCB2 | RESIST APPLICATION | COT02 | B | OCTOBER 2000 | ... |
| ... | ... | ... | ... | ... | ... |

| O U C A S T | CANDIDATE 1 | CANDIDATE 2 | CANDIDATE 3 | ... |
|---|---|---|---|---|
| ... | ... | ... | ... | ... |
| B | [B、B] | — | — | — |
| A | [B、A] | [B、D] | — | — |
| B | [A、A] | [A、B] | — | — |
| NONE APPLICABLE | [C、C] | — | — | — |
| ... | ... | ... | ... | ... |

(1) CASSETTE NAME B IS MANUALLY SET DURING CHECKS WHICH ARE RUN THROUGH TO THE END.

(2) CASSETTE USAGE RULES ARE CHANGED SO THAT CANDIDATE [B, B] IS APPLIED HERE.

SEMICONDUCTOR DEVICE PRODUCTION MANAGEMENT SYSTEM, AND SEMICONDUCTOR DEVICE PRODUCTION METHOD

BACKGROUND OF THE INVENTION

1. Field of the Invention

The present invention relates to a semiconductor device production management system, and a semiconductor device production method. More particularly, the invention relates to a production management system for managing operating conditions of wafer carrier cassettes, as well as to a semiconductor device production method involving the use of that production management system.

2. Description of the Background Art

During production of semiconductor devices, wafer carrier cassettes are managed so that the quality and yield of the semiconductor products are improved. A typical method of such management is illustratively disclosed in Japanese Patent Laid-Open No. Hei 6-183524. The disclosed method involves managing the number of times each wafer carrier cassette is used so as to forestall deteriorating conditions associated with the cassette being overused, such as deformation, friction-induced destruction of the cassette in transit, or dust emanating from the cassette itself.

A major factor responsible for deterioration in the quality and yield of semiconductor devices is the spread of contaminants over a semiconductor wafer in addition to the cassette breakdown and dust emanations mentioned above. How contaminants can spread over the semiconductor wafer is outlined below with reference to FIGS. 20 through 23.

FIG. 20 is a perspective view of a wafer carrier cassette 10 which contains wafers 12 and which is used during semiconductor device production. Inside the cassette 10 are a plurality of slits 14 that keep the wafers 12 in place therein.

FIG. 21 is a perspective view of a case 16 accommodating a cassette 10. The case 16 is made up of a body 18 and a base 20 detachable from each other. A handle 22 for manually carrying the case 16 is secured to the body 18.

FIG. 22 is an enlarged view of a tip of the wafer 12 held inside the slit 14. As illustrated, the slit 14 and wafer 12 can bear a substance 24 emanating from semiconductor device production processes. When a wafer 12 bearing the substance 24 following a certain process is inserted into a slit 14, the direct contact between the wafer 12 and the slit 14 leaves the substance 24 stuck inside the slit 14. The wafer 12 is then taken out of the cassette 10 and subjected to a lower end process. Thereafter, the wafer 12 is again inserted into the slit 14. This causes the substance 24 left in the slit 14 to cling back to the wafer 12. The substance 24, required in a certain process, can thus turn into a contaminant in a different process.

FIG. 23 is a schematic view explaining how contaminants can spread over the wafer 12 during semiconductor device production. In the setup of FIG. 23, a product 1 is supposed to be processed by first production equipment 26 alone in the normal course of production. In this example, the product 1 is shown processed by second production equipment 30 by human error after being processed by the first production equipment 26. In such a case, a second substance 32 used inside the second production equipment 30 can be contaminated by a first substance 28 stuck to the wafer 12 in the first production equipment 26.

In FIG. 23, a product 2 is supposed to be processed by the second production equipment 30. If the second substance 32 has come to be contaminated by the first substance 28 as described above, the product 2 is polluted by the first substance 28 while being processed by the second production equipment 30. In this manner, an error in the production flow of a single product can give rise to in-process contamination.

In the example of FIG. 23, a product 3 is supposed to be processed by the first production equipment 26 alone in the normal course of production. In this example, the product 3 is shown processed by the first production equipment 26 before being transferred by human error into a cassette that should be dedicated in use only to a process involving the second substance 32. In such a case, the transferred wafer 12 is contaminated by the second substance 32 that came off the dedicated cassette. In this manner, an error in the movement of a cassette of a single product can trigger in-process contamination.

As outlined above, human error in conventional semiconductor device production processes can often result in contamination of products. What follows is a brief supplementary explanation of how such contamination can affect the characteristics of semiconductor devices.

FIG. 24 is an enlarged view of a gate portion and its surroundings in an MOS transistor. The MOS transistor FIG. 24 has a gate insulating film 36 and a gate electrode 38 formed on a wafer 12. The gate insulating film 36 includes an insulation-deteriorated portion 40, i.e., a portion where a contaminant has deteriorated the quality of the film. Typical contaminants producing the insulation-deteriorated portion 40 are metals. Among the metals, particularly aluminum (Al) and copper (Cu) are liable to trigger high degrees of contamination due to large diffusion coefficients thereof. In FIG. 24, a voltage applied between the gate electrode 38 and the wafer 12 causes a large leak current 44 to flow through the insulation-deteriorated portion 40. Once the insulation-deteriorated portion 40 is formed, the MOS transistor can no longer function with correct electrical characteristics.

SUMMARY OF THE INVENTION

It is therefore an object of the present invention to overcome the above and other deficiencies of the prior art and to provide a semiconductor device production management system that effectively prevents the diffusion of contaminants caused by human error.

It is another object of the present invention to provide a semiconductor device production method for producing high-quality semiconductor devices at high yield rates using the inventive production management method.

The above objects of the present invention are achieved by a production management system for managing production of semiconductor devices. The system includes usage rule storing means for storing usage rules on containers for accommodating wafers with regard to individual processes included in a reviewable process flow. The system also includes reviewable process flow checking means for checking whether the reviewable process flow complies with the usage rules.

The above objects of the present invention are achieved by a production management system for managing production of semiconductor devices. The system includes production line process flow storing means for storing a plurality of processes included in a production line process flow for use on a semiconductor device production line. The system also includes container condition storing means for storing usage rules on containers for accommodating wafers with regard to each of the processes included in the production line process flow. The system further includes usage rule supplying means for supplying the usage rules regarding the containers to either pieces of production equipment for executing the processes included in the production line process flow, or to devices installed close to the pieces of production equipment.

The above objects of the present invention are achieved by a semiconductor device production method for producing semiconductor devices by use of a production management method described above.

Other objects and further features of the present invention will be apparent from the following detailed description when read in conjunction with the accompanying drawings.

BRIEF DESCRIPTION OF THE DRAWINGS

FIG. 5 is a table of typical cassette usage rules applied to the first embodiment of the invention;

FIG. 6 is a table of typical codes used by the first embodiment;

FIG. 9 is a schematic view of a process flow created by use of the production management system of FIG. 1;

FIG. 10 is a table outlining steps for process flow checks performed by the production management system of FIG. 1;

FIG. 12 is a schematic view of a typical display screen of a processing condition presented on display to a line operator by the production management system of FIG. 1;

FIG. 13 is a schematic view of a typical cassette change prompt screen presented on display to the line operator by the production management system of FIG. 1;

FIG. 16 is a table of typical definitions of cassettes used by a third embodiment of this invention;

FIG. 17 is a table of a typical process flow created by a fourth embodiment of this invention;

FIG. 19 is a table explaining a stage of process flow checks carried out by a fifth embodiment of this invention;

DESCRIPTION OF THE PREFERRED EMBODIMENTS

Figure 1:
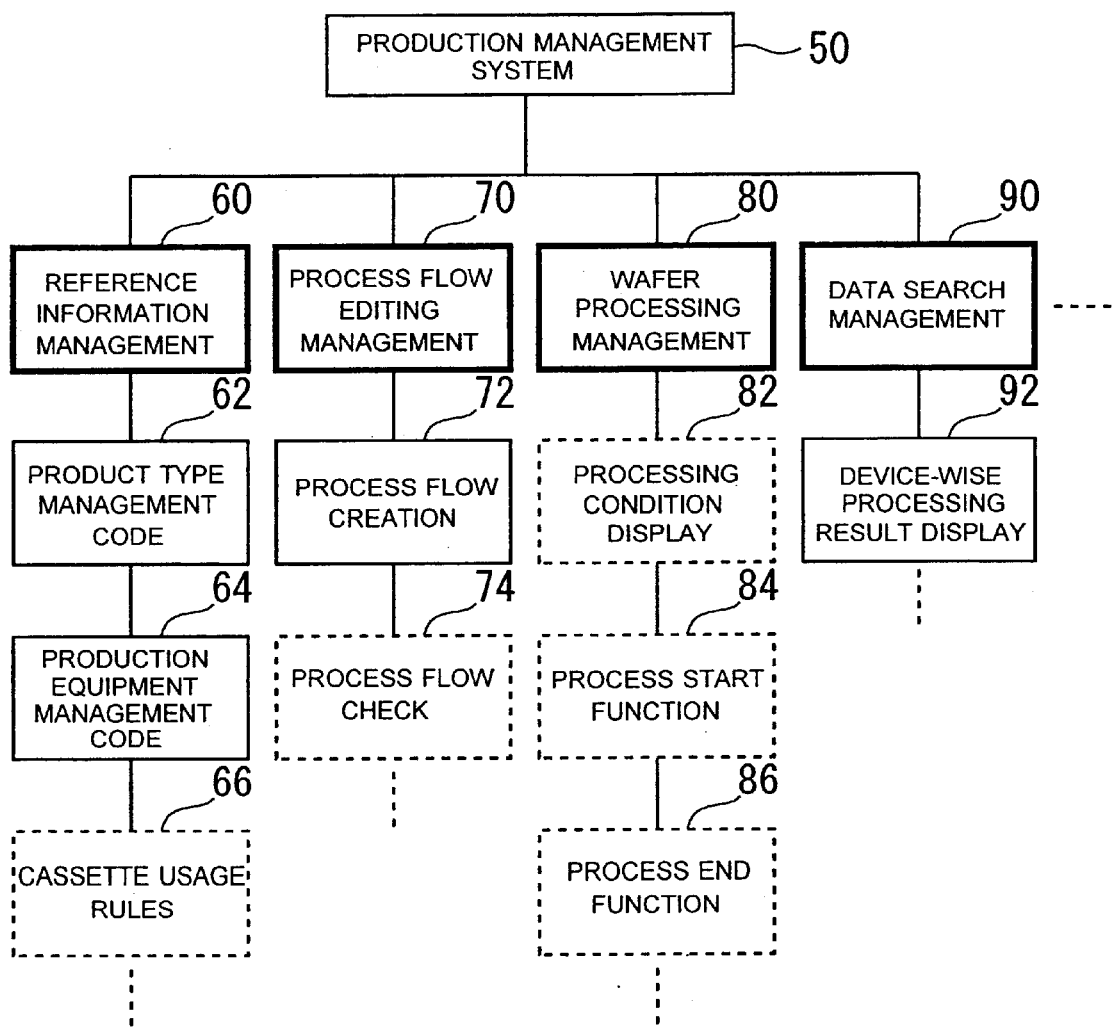
FIG. 1 is a block diagram of a production management system practiced as a first embodiment of this invention.

Preferred embodiments of this invention will now be described with reference to the accompanying drawings. Like reference characters designate like or corresponding parts or steps throughout the drawings, and descriptions of such parts or steps are omitted where redundant.

First Embodiment

FIG. 1 is a block diagram outlining functions of a production management system 50 practiced as the first embodiment of the invention. The production management system 50, installed on a semiconductor device production or development line (simply called the production line hereunder), manages all information necessary for semiconductor device production ranging from the charging of materials such as wafers 12 into the production line to the completion of semiconductor devices.

The production line comprises numerous pieces of production equipment which are manned as needed by operators. This type of production line, which could be dedicated to producing a single kind of semiconductor devices, today fabricates semiconductor devices of diverse types in small quantities each in general. Each production line includes a large number of process flows requiring appropriate management, which takes a lot of time to accomplish.

As shown in FIG. 1, the production management system 50 of the first embodiment includes a reference information management function 60. Implemented by such computer resources as a processing unit and a memory, the reference information management function 60 is mostly utilized by personnel in charge of managing contaminated states of products (i.e., contamination managers). The reference information management function 60 comprises a product type management code processing function 62, a production equipment management code processing function 64, and a cassette usage rule processing function 66.

The product type management code processing function 62 is designed to record and retain codes for managing types of products to be fabricated by the production line, particularly such products as DRAMs, SRAMs, flash memories, DSPs and MPUs. The production equipment management code processing function 64 records and retains codes for managing a plurality of pieces of production equipment installed on the production line. The cassette usage rule processing function 66 is unique to the system of the first embodiment; this function is intended to record and retain predetermined usage rules on the cassettes for use on the production line.

The production management system 50 of the first embodiment also includes a process flow editing management function 70. Implemented by compute resources, the process flow editing management function 70 is employed primarily by those in charge of product development (i.e., product developers) while creating process flows of individual products. A process flow is a set of information defining processing conditions and sequences in effect from the time materials such as wafers 12 are charged into the production line until products are completed. More specifically, a process flow is a combination of various items of information about a plurality of processes (i.e., information on processing conditions and production equipment to be used in individual processes).

The process flow editing management function 70 includes a process flow creation function 72 and a process flow check function 74. The process flow creation function 72 supports product developers in creating process flows of individual products. The process flow check function 74 is unique to the system of the first embodiment; this function checks to see if whether a given cassette assigned to a process flow being created complies with predetermined cassette usage rules.

The production management system 50 of the first embodiment comprises a wafer processing management function 80. This function is used primarily by production line operators in preventing operational mistakes during fabrication, and is implemented by computer resources and display devices attached to individual pieces of production equipment.

The wafer processing management function 80 includes a processing condition display function 82, a process start function 84, and a process end function 86. The processing condition display function 82 allows process details (i.e., processing conditions) for execution by individual pieces of production equipment to be displayed for review by line operators beforehand. By referring to the displayed processing conditions, the line operator can apply suitable processing to individual products. On an automated production line, necessary processing conditions are transferred automatically to the production equipment and executed suitable operations automatically thereby on each product. With the first embodiment, the processing conditions above include rules defining how cassettes are to be handled by different pieces of production equipment. By following such rules, the line operator can handle individual products using suitable cassettes.

The process start function 84 manages the date and time of process starting or the like about each process included in process flows. With the first embodiment, the process start function 84 again displays the appropriate cassette handling rule for review by the operator at the start of a given process. With the date and time of process starting suitably managed, it is possible for the operator precisely to grasp which products are to be processed in which processes. When cassette handling rules are shown again to the operator at this stage, human error about the ways to handle cassettes is effectively eliminated.

The process end function 86 manages the date and time of process ending or the like about each process included in process flows. With the first embodiment, the process end function 86 again displays the applicable cassette handling method for review by the operator at the end of a given process. In this manner, the process end function 86 makes it possible for the operator precisely to grasp which products have been processed in which processes while effectively preventing human error in handling cassettes.

The production management system 50 of the first embodiment further comprises a data search management function 90. This function includes a device-wise processing result display function 92 and other features and supports management of search for various data. The data search management function 90 is not unique to the system of the first embodiment and thus will not be described further.

How the production management system of the first embodiment works will now be described with reference to FIGS. 2 through 13.

Figure 2:
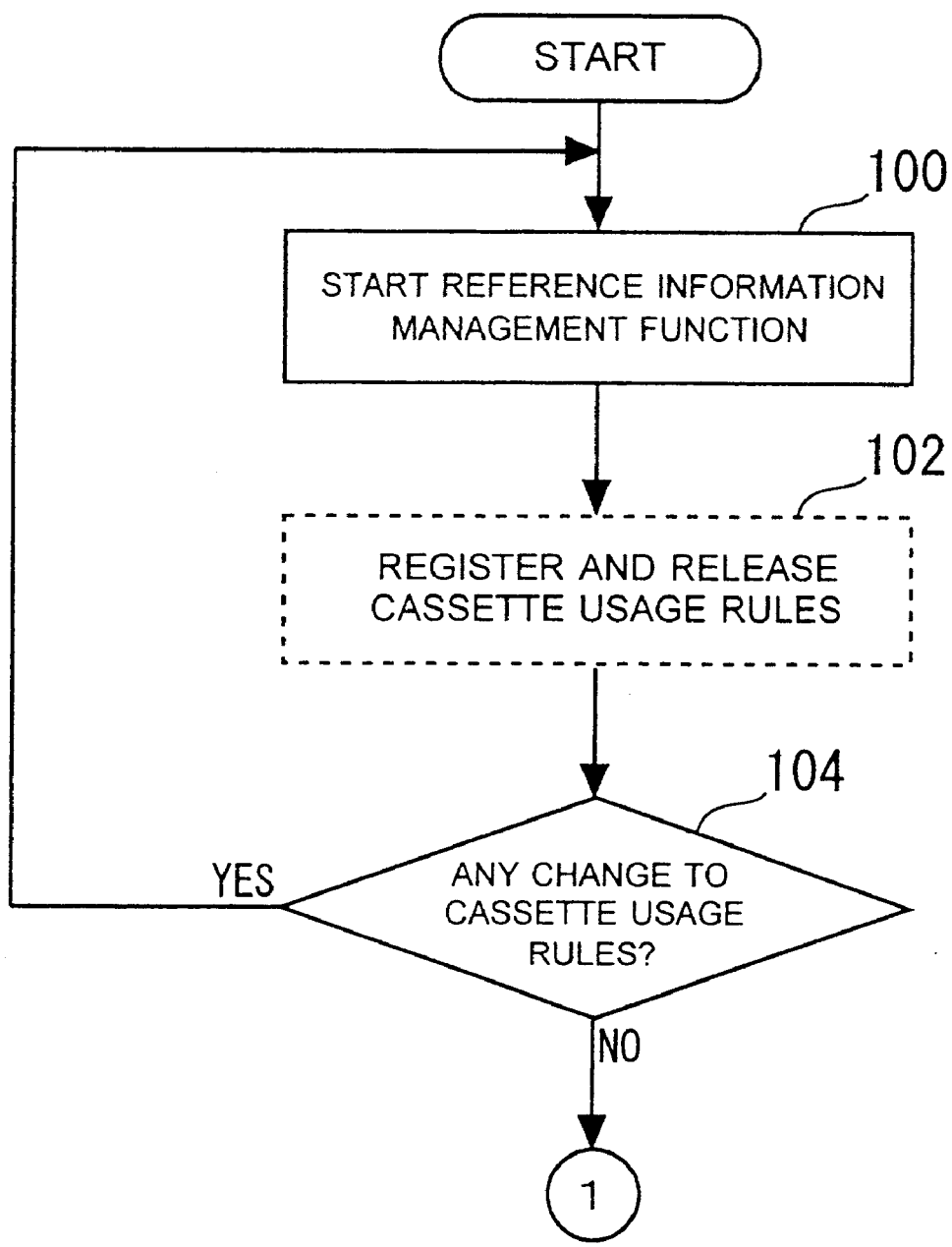
FIGS. 2 to 4 shows a flowchart of steps performed by the production management system of FIG. 1.
Figure 3:
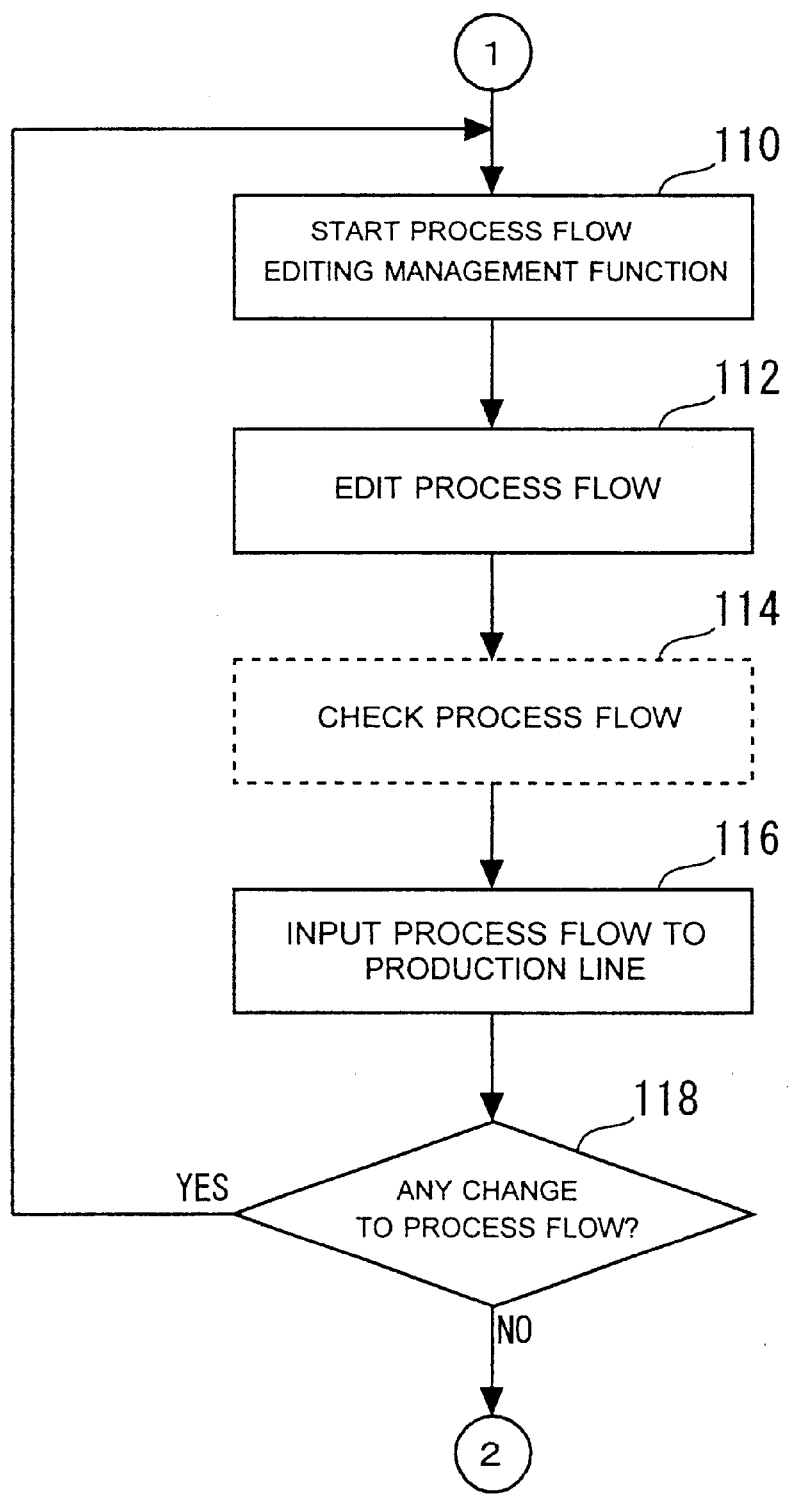
Figure 4:
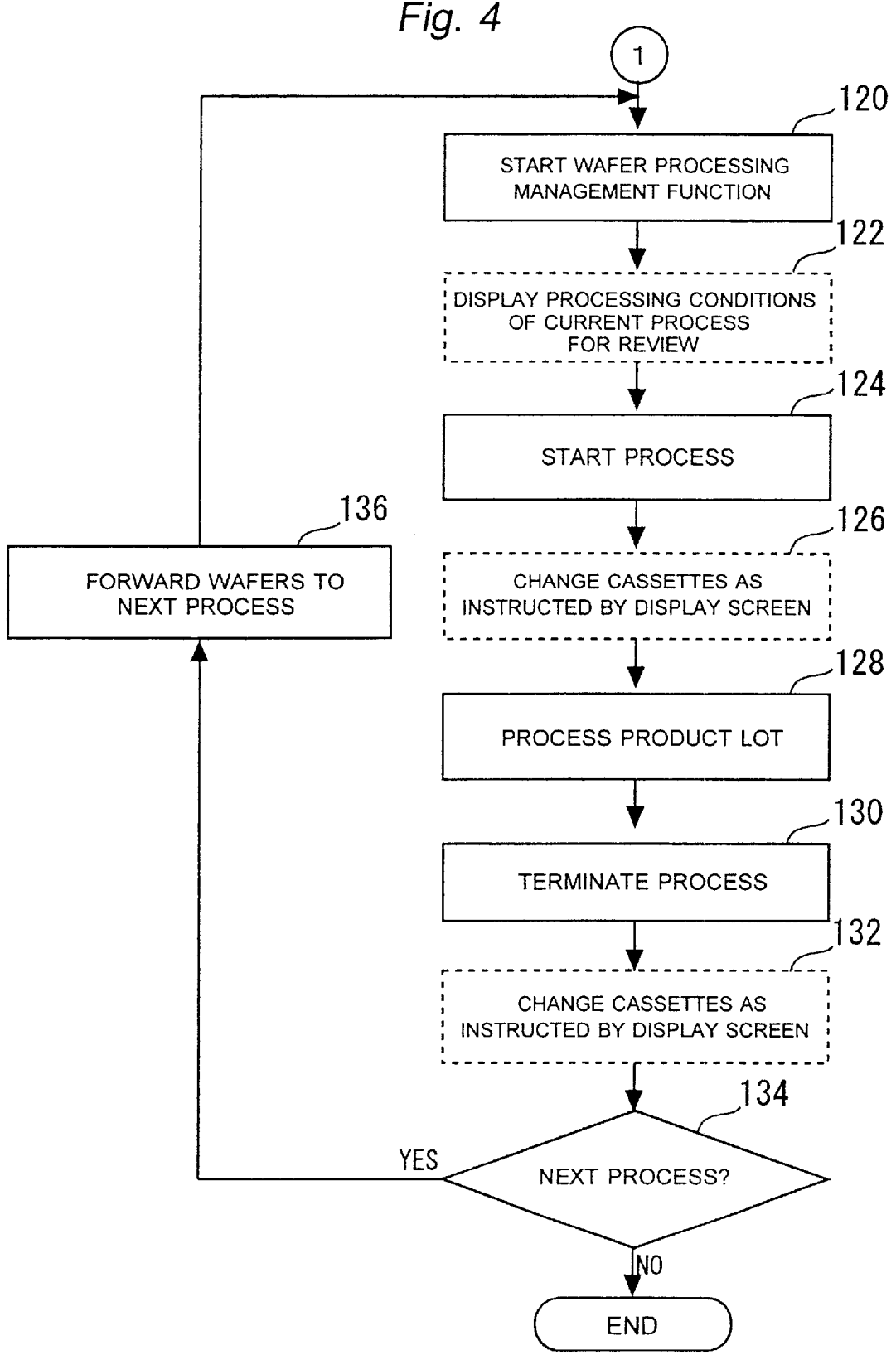

FIGS. 2, 3 and 4 are flowcharts of steps outlining how various functions of the production management system of this embodiment operate. More specifically, FIG. 2 is a flowchart of steps implementing the reference information management function 60; FIG. 3 is a flowchart of steps implementing the process flow editing management function 70; and FIG. 4 is a flowchart of steps implementing the wafer processing management function 80.

In the flowchart of FIG. 2, the reference information management function 60 is first started (in step 100). Cassette usage rules are then registered, and the registered information is released for use at individual locations on the production line (in step 102).

If there is no change or addition to the cassette usage rules, the registered rules are released to permit execution of the steps in FIGS. 3 and 4. If any change or addition is made to the rules, step 100 and subsequent steps are repeated as needed (in step 104).

It should be noted that independently of the flow of processing in FIG. 3 or 4, step 100 and subsequent steps can be repeated whenever needed in connection with a change or an addition to products to be fabricated or with an alteration of a process flow.

Figures 7, 8:
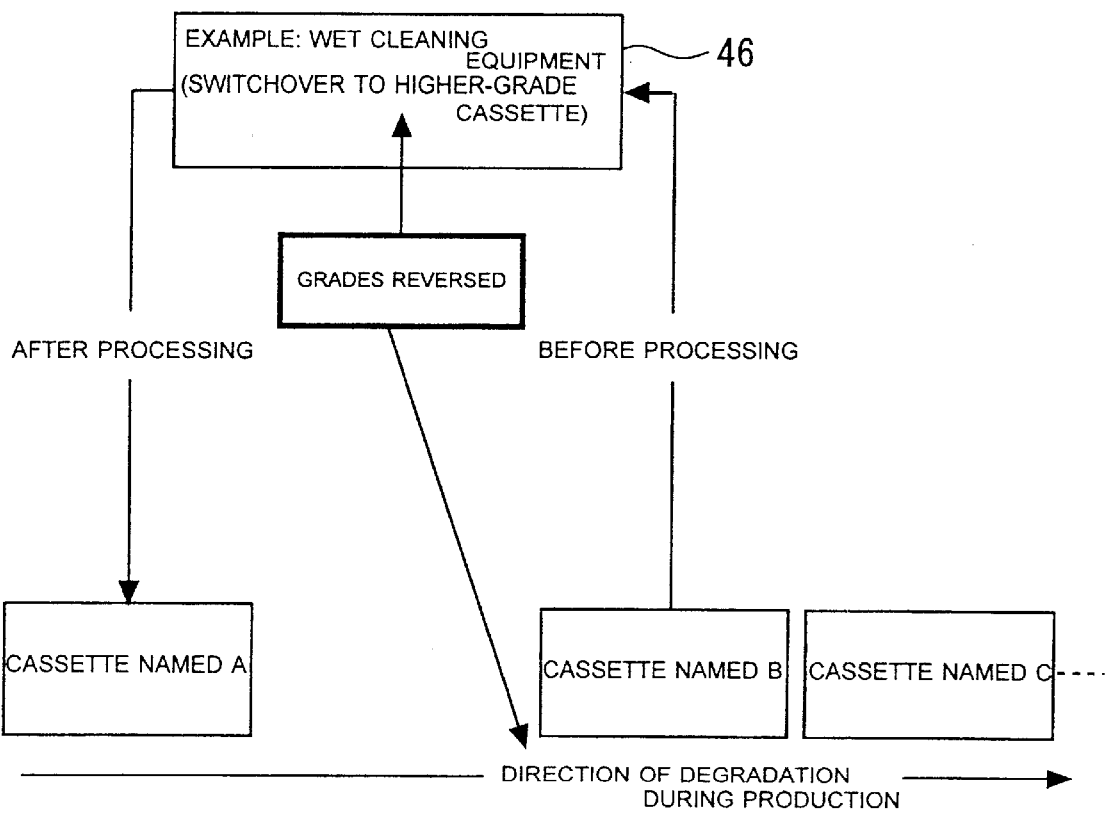
FIG. 7 is a table of definitions of cassettes used by the first embodiment.
FIG. 8 is a schematic view explaining how a cassette grade is inverted.

FIG. 5 is a table of typical cassette usage rules registered in step 102. FIG. 6 is a table of typical codes used by the first embodiment in defining the cassette usage rules or the like. FIG. 7 is a table of cassette names (A, B, C, etc.) along with ranking of their grades and their degrees of contamination.

As shown in FIG. 5, the cassette usage rules are made up of rules each given a unique record number (1, 2, . . . , n, . . . ). Each rule defines a production equipment code (EPQCD), a production process code (PROCD), a carry-in cassette name (INCAST), an in-process cassette name (PRCAST), and a carry-out cassette name (OUCAST).

In order to protect wafers 12 against contamination, it is important suitably to manage cases 16 as well as cassettes 10. That is because the case 16 can be contaminated by gases emanating from a substance 24 used in a process despite the absence of direct contact with wafers 12. Such contamination is particularly prone to occur if the substance 24 is an organic material. In view of that contingency, the first embodiment includes specific rules about a carry-in case (INCASE) and a carry-out case (OUCASE) in the cassette usage rules. Although not shown in FIG. 5, each case is given a name indicative of its degree of contamination, as with cassettes (see FIG. 7).

In FIG. 5, the rule on record No. 1 illustratively specifies the following: for pre-wiring resist removal (RRB1) by use of a resist ashing device No. 1 (ASH01), a carry-in cassette, an in-process cassette and a carry-out cassette should each be a cassette 10 with a cassette name B (grade 2); a carry-in case should be a case 16 with a case name B (grade 2); and a carry-out case should be a case 16 with a case name A (grade 1). The rule on record No. 1 also specifies that a case grade reverse flag (EGRDUP) is to be on for the process in question.

The flag EGRDUP is turned on when the grade of a case 16 subjected to a given process is raised, i.e., when the degree of contamination of the case 16 in question is reduced. As with the flag EGRDUP, a cassette grade reverse flag (TGRDUP) included in the cassette usage rules in FIG. 4 is also turned on when the degree of contamination of a cassette 10 subjected to a given process is lowered.

The grade of the cassette 10 (and the case 16) generally deteriorates as fabrication progresses. That is, the cassette name (and the case name) changes from A to B to C in the course of fabrication as shown in FIG. 8. Illustratively, however, getting the contaminant 24 washed off the surface of the wafer 12 by wet cleaning equipment 46 raises the grade of a carry-out cassette (carry-out case) above that of a carry-in cassette (carry-in case). That is, the grade of the cassette 10 (case 16) in effect before a cleaning process is raised thereafter, not lowered. With its grade switching effect, the cleaning process effectively staves off diffusion of the contaminant 24. The grade reverse flags such as TGRDUP and EGRDUP are turned on for processes in which the grade switching is made available.

Of the cassette usage rules in FIG. 5, the rule on record No. 2 concerns the resist ashing device No. 1 (ASH01), as with the rule on record No. 1. Individual pieces of production equipment deployed on the production line perform a number of processes under diverse conditions depending on the purpose. For that reason, not one but a plurality of cassette usage rules may be set with regard to the same piece of production equipment.

In the flowchart of steps in FIG. 3, the process flow editing management function 70 is started first (in step 110). A product developer then edits a process flow using the process flow creation function 72 (in step 112).

Checks are made to see if the process flow being edited is correct (in step 114). The checks here center on whether the use of cassettes in the process flow of interest complies with the existing cassette usage rules. The checks performed in this step also ascertain the validity of processing conditions for each process, such as whether temperatures set for a given process flow comply with the processing capability of the production equipment.

Once the process flow being edited passes the checks of step 114, the process flow in question is input to the production line (in step 116).

If there is no change or addition to the process flow, the processes shown in FIG. 4 are carried out according to the input process flow. If there is a change or an addition to the process flow, step 110 and subsequent steps are repeated to accommodate such modification (in step 118).

It should be noted that independently of the flow of processing in FIG. 4, step 110 and subsequent steps can be repeated whenever needed in connection with a change or an addition to products to be fabricated or with an alteration of any production condition.

FIG. 9 shows part of a process flow created by use of the process flow creation function 72 (in step 112). For the sake of clarity, FIG. 9 lists a plurality of processes with their actual process names as well as their production process codes (PROCD) The data about the date and time of process starting are input by use of the process start function 84. While the process flow is being created, the checks in step 114 verify whether the arrangement of cassette names in the OUCAST column complies with the cassette usage rules.

FIG. 10 shows a typical display screen used for the checks above. More specifically, FIG. 10 gives a screen that displays in tabular form all cassette data applicable to the four processes in the process flow of FIG. 9. The cassette data here signify a combination of data (INCAST, OUCAST) which represent a carry-in cassette and a carry-out cassette included in the cassette usage rules (FIG. 5).

Multiple sets of cassette usage rules may be established for the same piece of production equipment as described above. It follows that a plurality of cassette data items maybe applicable to each of the processes making up a given process flow. In the example of FIG. 10, the process of the first record and that of the fourth record are assigned a single cassette data candidate each while the process of the second record and that of the third record are assigned two cassette data candidates each.

The checks above on the process flow first extract a group of processes such as one shown in FIG. 10, constituted illustratively by one or multiple undefined processes and by defined processes locating upper end or lower end of the undefined process or processes. Here, an undefined process means a process that has a plurality of cassette data candidates, while a defined process means one which has a single cassette data candidate assigned thereto. In the example of FIG. 10, the process of the first record is a defined upper end process while the process of the fourth record is a defined lower end process; the process of the second record and that of the third record are undefined processes.

The checks on the process flow then verify the process group extracted as described above to see whether the defined lower end process (of the fourth record) has its carry-in cassette name (INCAST) included as a carry-out cassette name (OUCAST) in an undefined upper end process (of the third record). The cassette data candidate (i.e., second candidate) that includes the carry-out cassette name (OUCAST) is regarded as appropriate while the data candidate (first candidate) not containing the carry-out cassette name (OUCAST) is judged unsuitable. The candidate judged unsuitable is withdrawn from the cassette data candidates for the third record, as shown deleted in FIG. 10.

If another undefined process (of the second record) exists upper end of the third record, a check is made to see if the carry-in cassette name (INCAST) in the cassette data candidate for the third record is included as a carry-out cassette name (OUCAST) in data candidates for the second record. The data candidate that includes the carry-out cassette name (OUCAST) is regarded as appropriate (i.e., first candidate) while the candidate not containing the carry-out cassette name (OUCAST) is judged unsuitable (second candidate). The second data candidate judged unsuitable is withdrawn from the cassette data candidates for the second record, as shown deleted in FIG. 10.

If no undefined process exists upper end of the second record, a check is made to see if the carry-in cassette name (INCAST) in the data candidates for the second record matches the carry-out cassette name (OUCAST) for the defined upper end process (of the first record). If a match is recognized, it is verified that the extracted group of processes complies with the cassette usage rules.

Numerals in squares in FIG. 10 indicate in ascending order the sequence in which the presence of suitable data candidates is checked. Alphabetic characters in squares represent in alphabetical order the sequence in which unsuitable data candidates are withdrawn from the candidates of the records involved.

Figure 11:
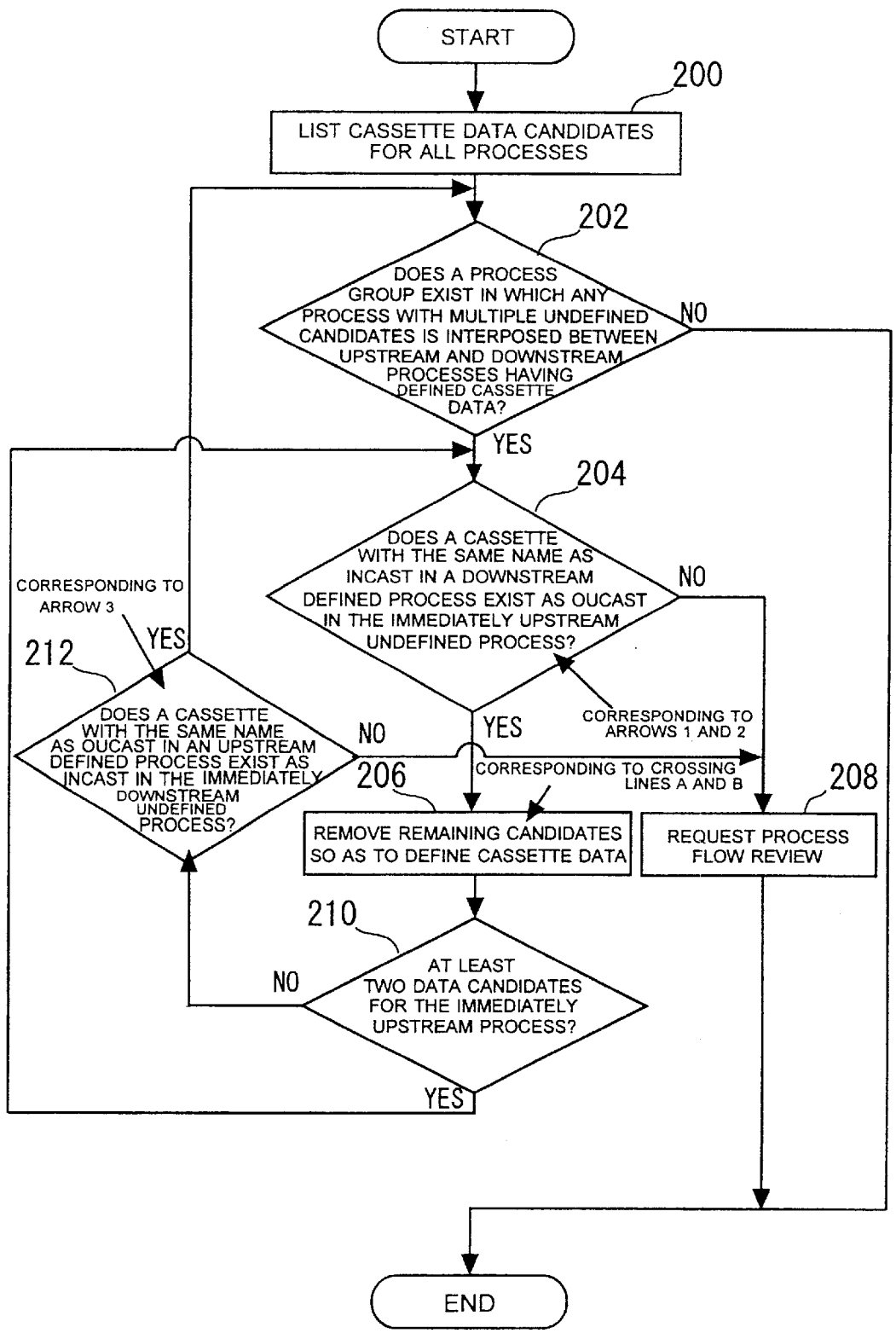
FIG. 11 is a flowchart of steps for process flow checks carried out by the production management system of FIG. 1.

FIG. 11 is a flowchart of steps constituting a series of specific processes performed by the production management system 50 of the first embodiment to implement the above-described checks on the process flow.

As shown in FIG. 11, the checks involve listing all cassette data candidates in advance for all processes included in the process flow (in step 200).

A check is then made to see if there is any process group wherein an upper end and a lower end process are each given defined cassette data and have other processes interposed therebetween each with a plurality of cassette data candidates assigned thereto. That is, it is verified whether one or multiple undefined processes are sandwiched between an upper end and a lower end defined process (in step 202). If such a process group is judged to exist, step 204 is reached; if no such process group is found, all processes are judged to have defined cassette data and this routine is terminated.

In step 204, a check is made to see if a cassette with the same name as a lower end defined carry-in cassette name (INCAST) exists in cassette data candidates as a carry-out cassette name (OUCAST) for the immediately upper end undefined process. Here, the lower end defined carry-in cassette name (INCAST) signifies either the carry-in cassette name (INCAST) of a lower end defined process if step 204 is carried out for the first time on a given process group, or the carry-in cassette name (INCAST) in a data candidate regarded as suitable in the preceding process cycle if step 204 is performed a second time or later on the process flow. In the example of FIG. 10, when step 204 is performed for the first time, it is ascertained whether a cassette having the same name as INCAST of the forth record exists in the data candidates (OUCAST) for the third record; when step 204 is carried out a second time, a check is made to see whether a cassette with the same name as INCAST in the second cassette data candidate for the third record exists in the candidate data (OUCAST) for the second record.

If in step 204 a data candidate complying with the condition above is judged to exist in the candidate data for the undefined process, that candidate is regarded as a condition-compatible candidate. The remaining candidate data (condition-incompatible candidates) are removed so as to define the cassette data candidate (in step 206).

If in step 204 no candidate complying with the condition above is judged to exist in the candidate data for the undefined process, a review of the process flow is requested (in step 208) and this routine is terminated. In this case, those in charge of product development analyze the process group requested to be reviewed and modify the process flow as needed.

When the cassette data candidate has been defined for the undefined process in step 206, a check is then made to see if there are two or more data candidates for the immediately upstream process, i.e., whether the immediately upstream process is an undefined process (in step 210). If the immediately upper end process is judged to be undefined, step 204 and subsequent steps are again carried out; if the immediately upper end process is judged to be a defined process, then step 212 is reached.

In step 212, a check is made to see if the carry-out cassette name of the upper end defined process is the same as the carry-in cassette name in data candidates of the immediately downward undefined process. If the two cassette names match, then the process group extracted in step 202 is judged to comply with the cassette usage rules. In that case, step 202 is again performed in order to extract another process group subject to the scrutiny above. If the two cassette names fail to match, step 208 is reached in which a review of the process flow in question is requested.

As described, the production management system 50 of the first embodiment allows those in charge of development easily to create process flows complying with the cassette usage rules by use of the process flow editing management function 70. In this manner, the production management system of this invention effectively forestalls incorrect uses of the cassettes 10 or cases 16 attributable to process flow errors.

In the flowchart of FIG. 4, the wafer processing management function 80 is first started (in step 120).

The processing condition display function 82 is then used to display processing conditions of the ongoing process for review by line operators (in step 122). FIG. 12 shows a typical processing condition display screen presented on display to a line operator in step 122. As indicated, the line operator is shown information about an ongoing process such as a process name, a production equipment code, a carry-in cassette name, an in-process cassette name, a carry-out cassette name, and processing conditions. The line operator refers to these items of information to make sure that each process is executed correctly. The production management system 50 of the first embodiment thus helps effectively stave off human error during fabrication.

After the processing conditions above are verified by the line operator, the process start function 84 starts each process (in step 124). In step 124, a screen requesting the line operator to change cassettes is displayed as needed.

FIG. 13 shows a typical cassette change prompt screen presented on display to the line operator in step 124. In FIG. 13, an "OK" key is operated by the line operator acknowledging the displayed prompt message. A "CANCEL" key is used by the line operator upon responding negatively to the message. This screen appears for a process that requires placing wafers in a dedicated cassette for processing, or for a process wherein the cassette currently forwarded along the production line needs to be replaced by another cassette with a higher grade. If the screen is displayed, cassettes are to be changed manually or automatically according to the display (in step 126).

On a highly automated production line, the line operator may perform further checks using a cassette name reading device (e.g., a bar code system) after the screen of FIG. 13 is displayed.

In FIG. 4, step 126 is followed by step 128 in which a product lot is processed. The process end function 86 is then used to terminate the process in progress (in step 130).

In step 130, another cassette change prompt screen (the same as that in FIG. 13) is presented on display to the line operator as needed. This screen appears if it is necessary to replace the dedicated cassette with a general-purpose cassette at the end of the process or if a cassette with a grade different from that of the cassette that was used in the process is now needed for transport purposes. If the screen is displayed, cassettes are to be changed manually or automatically according to the display (in step 132).

On a highly automated production line, the line operator may perform further checks using a cassette name reading device (e.g., a bar code system) after the cassette change prompt screen is displayed.

In FIG. 4, a check is then made to see if the next process exists. If the next process is judged to exist, the in-process wafers are forwarded to that process (in step 136), and step 122 and subsequent steps are repeated. If no further process is judged to exist, the production process is terminated.

In the manner described, the production management system 50 of the first embodiment displays processing conditions for review by line operators before a product lot starts being processed in each process. If there is a need for changing cassettes at the start of a process or at the end thereof, a cassette change prompt screen is shown to the line operator at that point. These features make it possible for the production management system 50 of the first embodiment effectively to stave off human error in the setting of processing conditions or cassette replacement.

As described, the production management system 50 of the first embodiment facilitates creation of process flows complying with predetermined cassette usage rules, i.e., in a manner effectively forestalling diffusion of contaminants stemming from cassettes and cases. With processing conditions and cassette replacement instructions shown to the line operator, operational errors on the production line are effectively prevented. A production line system utilizing the first embodiment thus prevent human error in the development and production stages of semiconductor devices and thereby contributes to improving the quality and yield of such products.

Second Embodiment

Figures 14, 15:
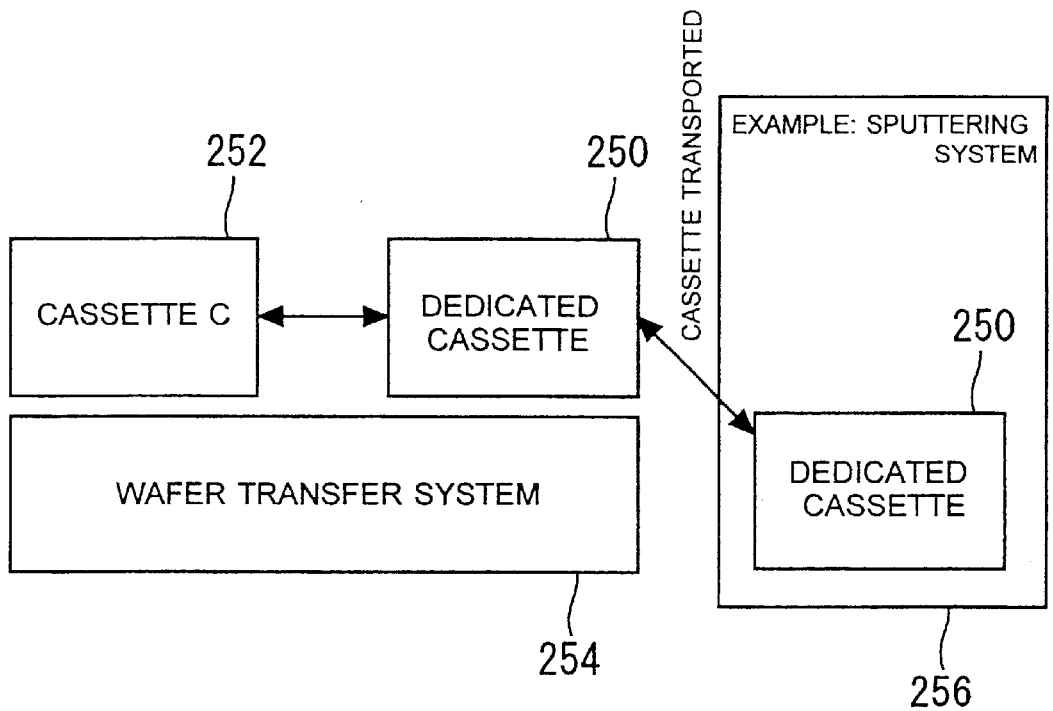
FIG. 14 is a schematic view explaining how a dedicated cassette is typically used on a production line.
FIG. 15 is a table of typical definitions of cassettes used by a second embodiment of this invention.

The second embodiment of this invention will now be described with reference to FIGS. 14 and 15. FIG. 14 is a schematic view explaining how a dedicated cassette 250 is typically used on a production line of semiconductor devices.

In FIG. 14, reference numeral 252 denotes a general-purpose cassette (with cassette name C) used to transport wafers. The general-purpose cassette 252 and dedicated cassette 250 are both placed on a wafer transfer system 254. The wafer transfer system 254 transfers wafers from inside the general-purpose cassette 252 into the dedicated cassette 250 and vice versa.

The general-purpose cassette 252 is generally molded out of plastic resin. If used in a process subject to a high temperature for processing, the general-purpose cassette itself can melt. Such a contingency is averted by use of the dedicated cassette 250 that is structured to withstand specific conditions of processing. Illustratively, a sputtering system 256 utilizes a metallic cassette 250 to withstand high wafer temperatures following the sputtering process.

When creating a process flow, the product developer defines the use of a dedicated cassette 250 in the flow. For correct management of general-purpose cassettes 252 in terms of grades, these cassettes alone need to be checked for process flow consistency while the dedicated cassette 250 is excluded from the checks.

For that reason, the dedicated cassette 250 in the second embodiment is defined as having a dedicated cassette name Z and a grade of −1, as indicated in FIG. 15. The dedicated cassette 250 is further established as an in-process cassette (PRCAST) shown in FIG. 6. A processing program of the production management system 50 is designed to verify whether a given process flow complies with predetermined cassette usage rules with the exception of cassettes with the grade −1 (or with the dedicated cassette name Z).

With the second embodiment, as in the case of the first embodiment, whether or not a process flow complies with cassette usage rules is judged on the basis of carry-in and carry-out cassette names for defined processes as well as carry-in or carry-out cassette names included in cassette data candidates for undefined processes. If the dedicated cassette 250 is established as an in-process cassette (PRCAST), then the process flow in question will be checked with the dedicated cassette 250 excluded. Even if the dedicated cassette 250 is set erroneously as a carry-in or carry-out cassette, its grade of −1 causes the cassette to be excluded upon checks on the process flow. Thus the production management system of the second embodiment will not run away when handling process flows with dedicated cassettes 250 included therein.

Third Embodiment

The third embodiment of this invention will now be described with reference to FIG. 16. A production management system of the third embodiment is designed to exclude from process flow checks a temporarily dedicated cassette used illustratively for introducing such as a new substance into the production line.

When a new substance is to be introduced into the production line, the grade of cassettes handling the substance may be left temporarily undefined. In that case, temporarily dedicated cassettes are often utilized as a carry-in and a carry-out cassette. As with the dedicated cassette of the second embodiment, these cassettes of dedicated but temporary nature are managed in grades in a manner different from general-purpose cassettes.

For the third embodiment, such temporarily dedicated cassettes are defined as having a cassette name Y and a grade of −1, as shown in FIG. 16. A program in the production management system of the third embodiment is designed to verify whether a given process flow complies with predetermined cassette usage rules with the exception of cassettes having the grade −1 (or the temporarily dedicated cassette name Y).

In the manner described, a given process flow will be checked for the cassette usage rules with the exception of the temporarily dedicated cassettes. Thus the production management system of the third embodiment will not run away when handling process flows with temporarily dedicated cassettes included therein.

Fourth Embodiment

The fourth embodiment of this invention will now be described with reference to FIGS. 17 and 18. The production line of semiconductor devices sometimes handles within a single cassette both product wafers and monitor wafers. The product wafers are wafers from which end products are ultimately derived, and the monitor wafers are those subject to various measuring steps (e.g., for film thickness measurement) during fabrication. A production management system of the fourth embodiment is designed to perform process flow checks correctly where the product and monitor wafers are handled in mixed fashion.

FIG. 17 is a table of a typical process flow created for a lot that has monitor and product wafers mixed therein. This process flow includes a monitor film thickness measuring process (CKS3) involving extracting from a given cassette only a monitor wafer to be measured for film thicknesses at predetermined wafer locations. During the measurement, product wafers are kept intact inside the cassette.

Figure 18:
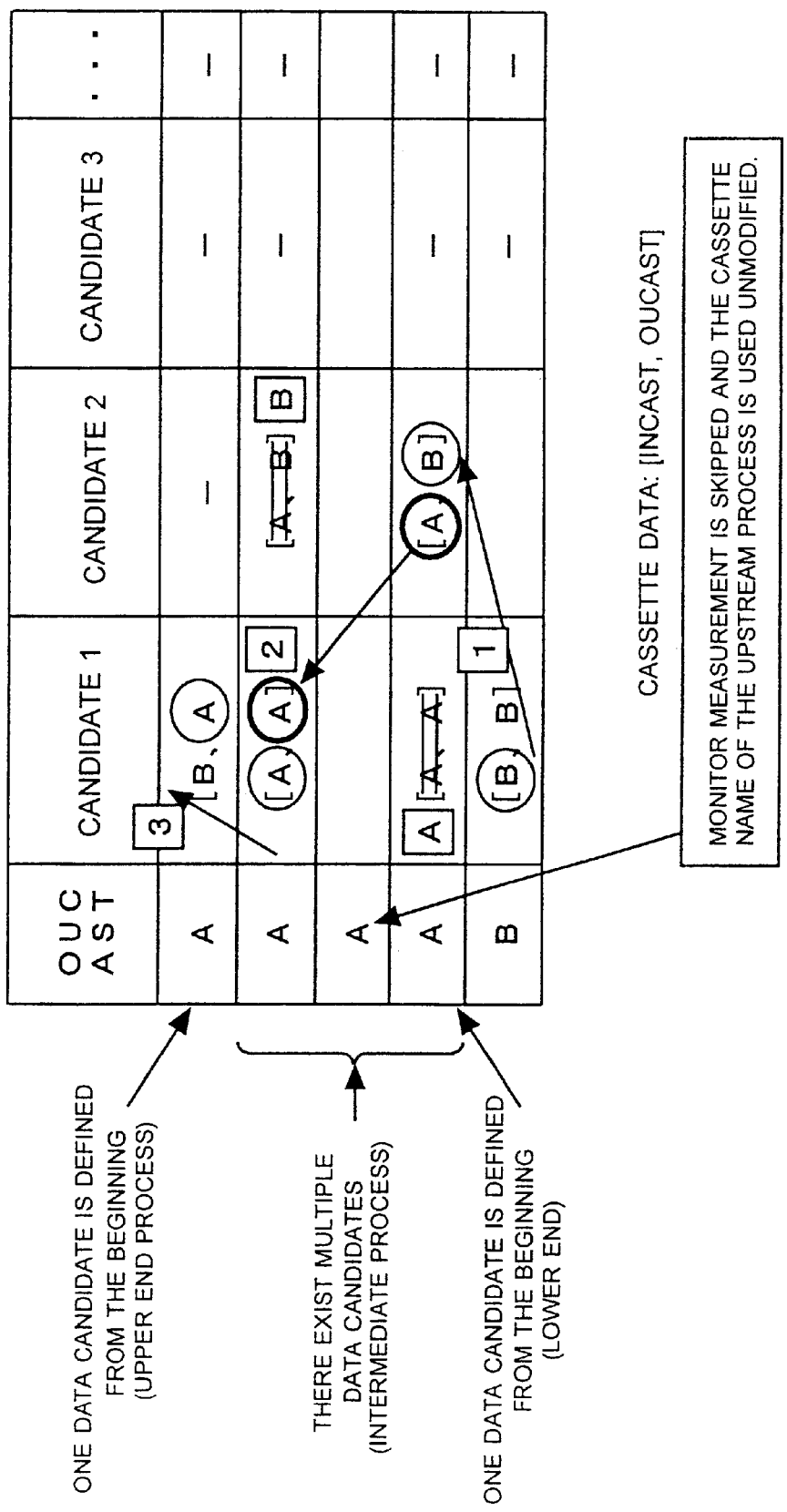
FIG. 18 is a schematic view explaining a stage of process flow checks performed by the fourth embodiment.
Figure 20:
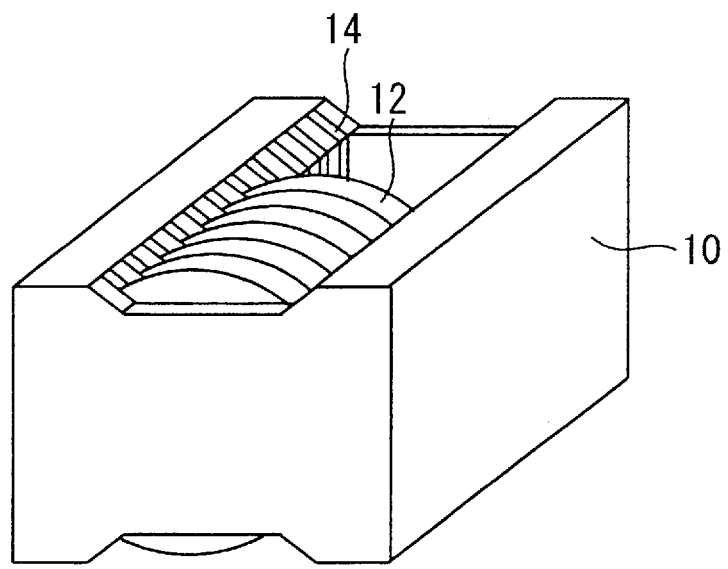
FIG. 20 is a schematic view showing a typical structure of a wafer carrier cassette.
Figure 21:
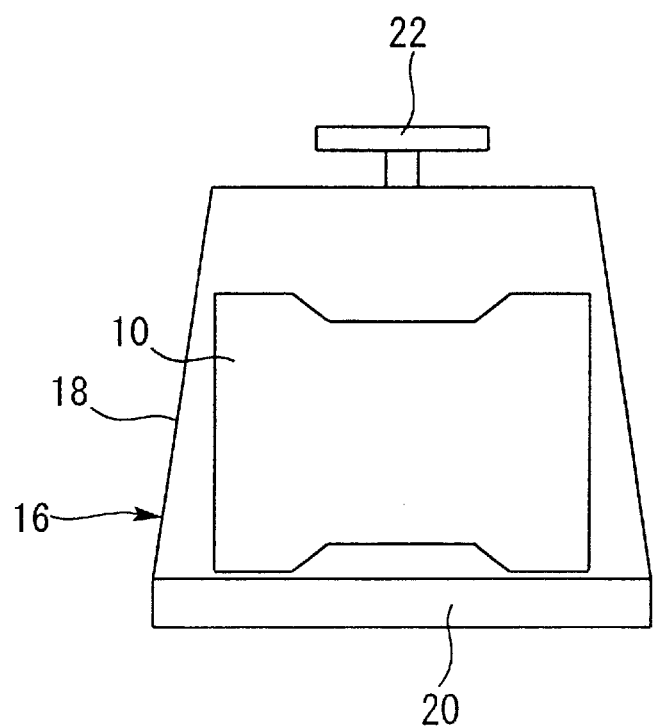
FIG. 21 is a schematic view depicting a typical structure of a case for transferring wafers.
Figure 22:
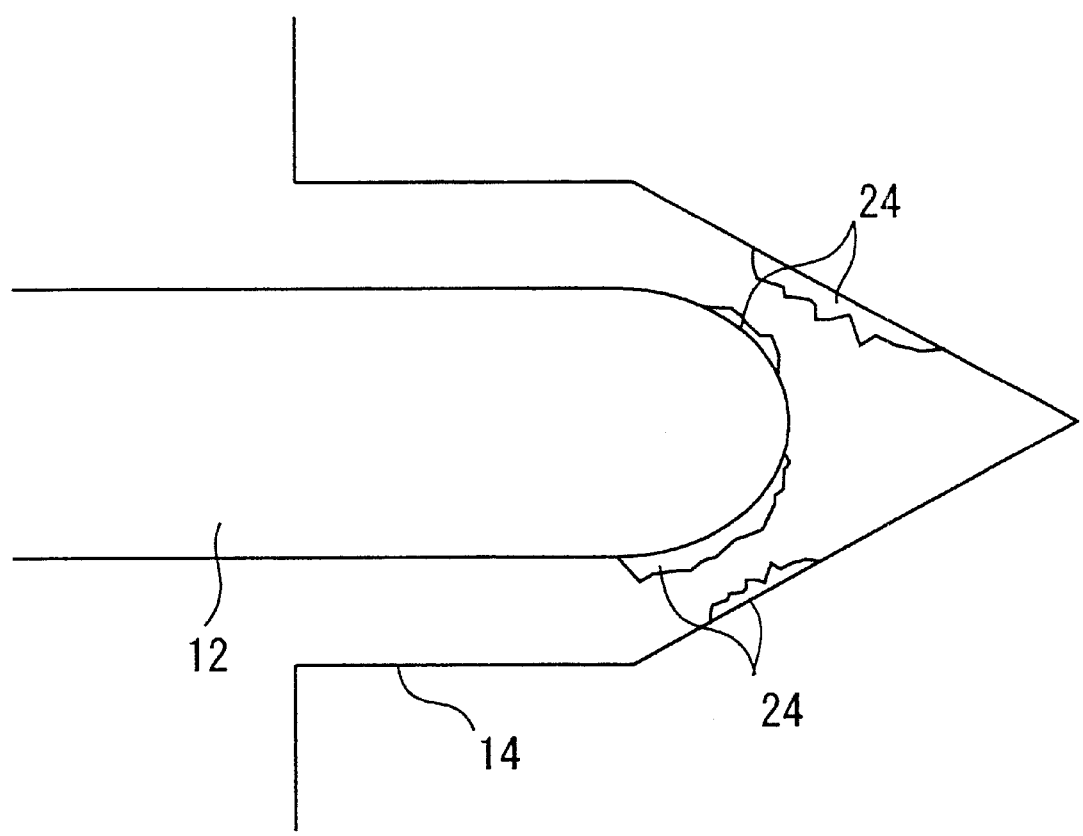
FIG. 22 is a schematic view illustrating how a wafer and a cassette can be typically contaminated by a substance used during production.
Figure 23:
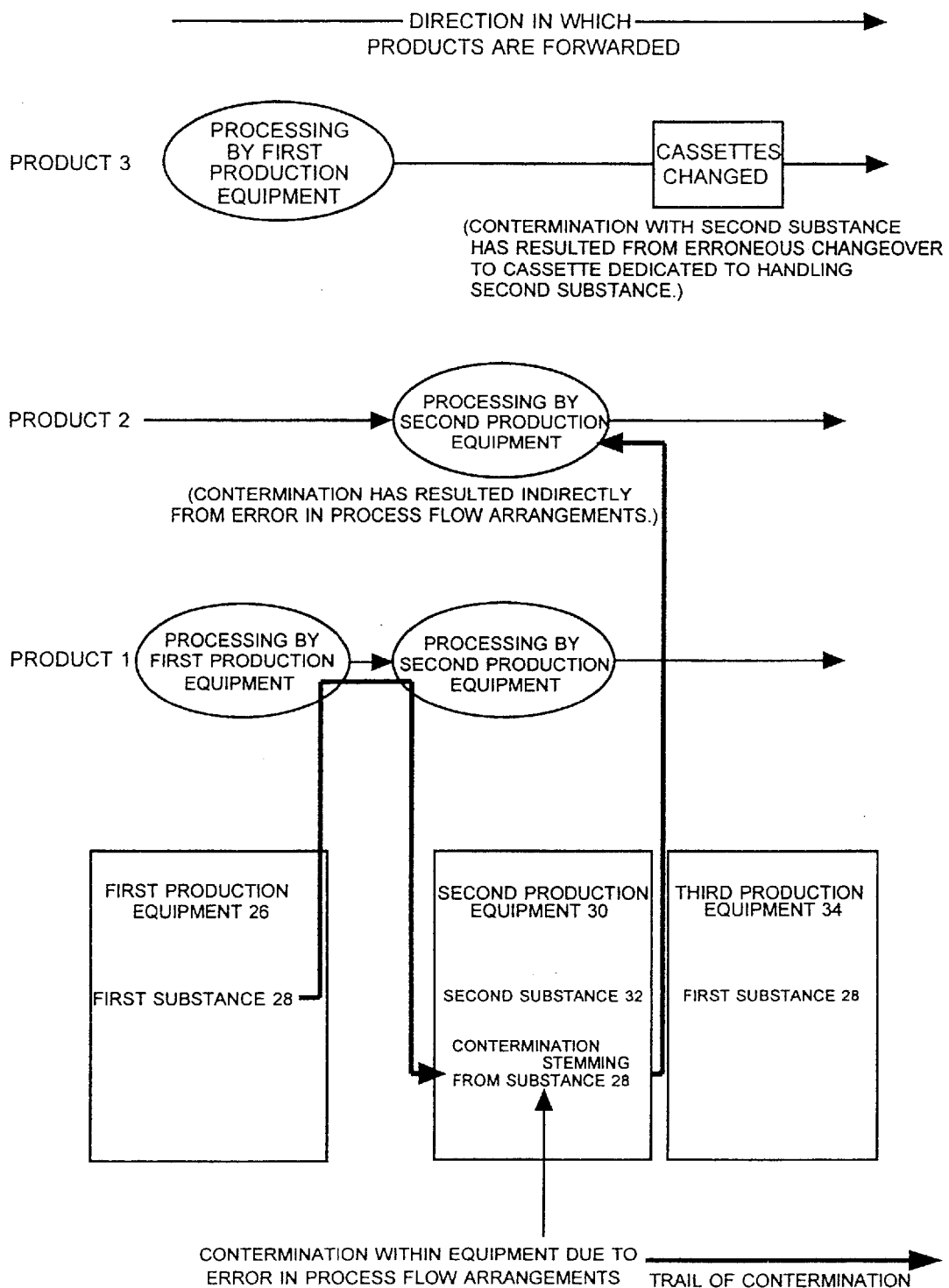
FIG. 23 is a schematic view explaining how wafer contamination can occur.
Figure 24:
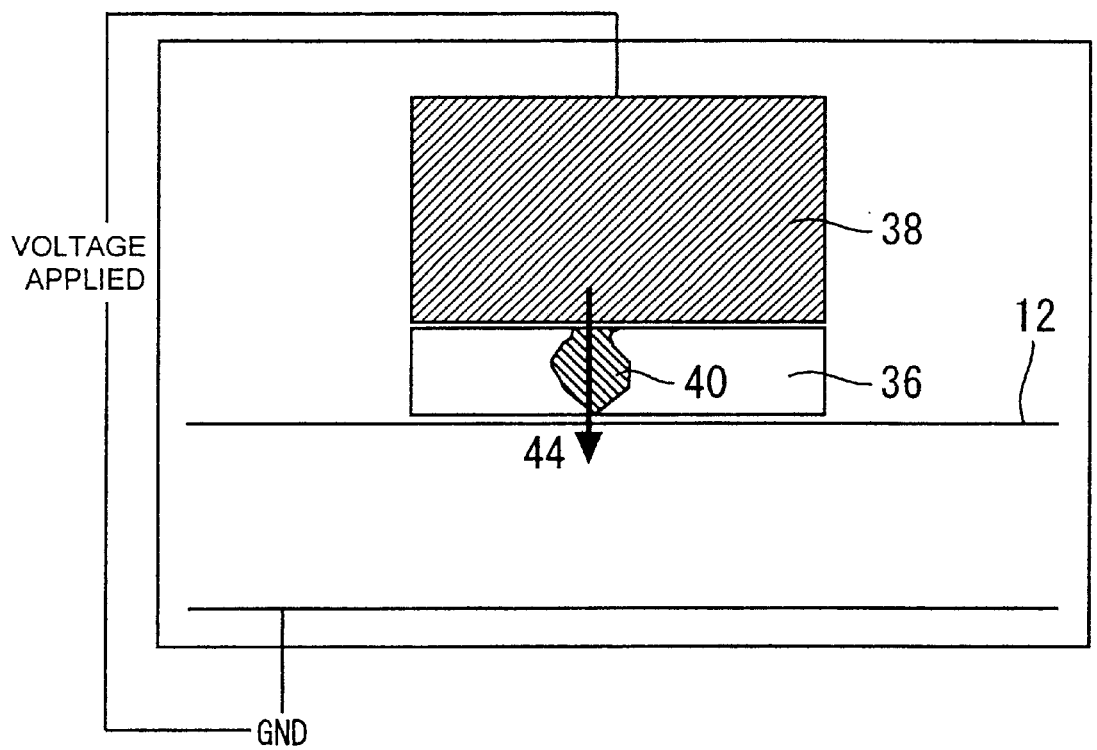
FIG. 24 is a schematic view picturing a problem associated with wafer contamination.

FIG. 18 shows a typical screen displayed by the production management system of the fourth embodiment during checks on a process flow. More specifically, FIG. 18 indicates a screen in which the five processes included in the process flow of FIG. 17 are each assigned all applicable cassette data candidates shown tabulated.

The production management system of the fourth embodiment is designed so that no cassette data candidates are listed for a process in which a monitor wafer alone is processed selectively (e.g., the monitor film thickness measuring process above). In FIG. 18, all space of data candidates for the third record corresponding to the monitor film thickness measuring process are thus left blank.

During process flow checks, the production management system of the fourth embodiment skips records of processes in which monitor wafers are selectively processed as well as records for which no cassette data candidate exists. More specifically, the inventive production management system is designed to ignore in the flowchart of FIG. 11 all processes wherein monitor wafers alone are processed selectively (e.g., steps 204, 210, 212).

During the process flow checks, as described, the production management system of the fourth embodiment excludes from a given process flow any process in which a monitor wafer alone is processed selectively (such as the monitor film thickness measuring process). This makes it possible for the system to avert runaway while checking any process flow that contains a process involving processing of a monitor wafer alone and the checks are carried out properly.

Fifth Embodiment

The fifth embodiment of this invention will now be described with reference to FIG. 19. A production management system of the fifth embodiment is designed to facilitate a process flow review requested as a result of process flow checks (see step 208 in FIG. 11).

FIG. 19 shows what is typically displayed if the request is made during process flow checks for a review of a process flow. Four records listed in FIG. 19 constitute the process group extracted by step 202 in FIG. 11. The four records are named the first record through the fourth record as seen from top to bottom.

In FIG. 19, the fourth record has only one cassette data candidate [C, C] listed in association therewith, whereas the third record is assigned two data candidates [A, A] and [A, B]. In this example, the cassette name INCAST of the fourth record is not included in the data candidates for the third record (as OUCAST). This gives rise to a request for a review of the process during process checks on these two records.

Possible causes for triggering the process review request include an inconsistent process flow and a faulty cassette usage rule. Given the process flow review request, the production management system of the fifth embodiment displays a review prompt screen shown in FIG. 19 for review by those in charge of product development. By referring to the screen, the product developer can readily detect what is wrong in the process flow of interest.

According to another function of the production management system of the fifth embodiment, if a process review request is issued because there is no cassette data candidate (OUCAST) matching INCAST of a given process (downstream process) in the data candidates for an upstream process, then the cassette name INCAST of the downstream process is allowed to be set manually for a desired cassette name. In the example of FIG. 19, the product developer can set the cassette name INCAST of the fourth record manually for B.

When the cassette name INCAST for an erroneously structured process is set manually as described above, the production management system of the fifth embodiment then continues its process flow checks using the manually set cassette name INCAST. In this manner, even if an extracted process group contains errors, the inventive system can easily execute its process checks to the end on the process group in question.

After the checks on the extracted process group have come to an end, the product developer makes necessary modifications to correct any defects that may have been detected. If the defects are associated with any process flow, that flow is corrected; if the defects are not related to process flows, the cassette usage rules are reviewed and altered in a manner that will not entail any adverse effects with regard to past results of grade control experiments. Illustratively, in the example of FIG. 19, the data candidate [C, C] for the fourth record is replaced by the candidate [B, B].

As described and according to the production management system of the fifth embodiment, if a process flow review is requested, a point causing that request (i.e, a cassette data candidate) is clearly indicated to those in charge of product development. The inventive production management system allows cassette data candidates to be replaced as needed and thus permits checking the process group to the end. This makes it possible readily to create process flows complying with predetermined cassette usage rules and effectively stave off human error in development and production stages of products.

The embodiments of this invention constituted as described above provide following effects:

According to a first aspect of the present invention, there is provided a production management system which permits easy checks on whether process flows to be verified comply with usage rules on cassettes for accommodating wafers. This makes it possible to accept as production line process flows those flows that have been ascertained for proper cassette usages in individual processes.

According to a second aspect of the present invention, the usage rules on the cassettes to be used for individual processes making up a production line process flow can be utilized in a production equipment or other devices installed nearby the production equipment. This feature forestalls improper use of cassettes in any of the processes involved.

According to a third aspect of the present invention, the cassette usage rules are shown on display to line operators who manage individual processes. This prevents inappropriate use of cassettes in any of the processes involved.

According to a fourth aspect of the present invention, a line operator is instructed to change cassettes if a carry-in cassette differs from an in-process cassette or if an in-process cassette is different from a carry-out cassette. This feature staves off improper use of cassettes.

According to a sixth aspect of the present invention, processing conditions for use in individual processes constituting a production line process flow can be utilized in a production equipment or other devices installed nearby the production equipment. This effectively prevents leaving errors in processing conditions for any of the processes involved.

According to a seventh aspect of the present invention, the processing conditions of individual processes are indicated to line operators for review. This feature also prevents errors effectively in processing conditions for any of the processes involved.

According to an eighth aspect of the present invention, process flows containing processes requiring dedicated cassettes can be checked without checking these dedicated cassettes. This makes it possible for the system properly to check processing flows requiring the use of dedicated cassettes without the possibility of a system runaway.

According to a ninth aspect of the present invention, process flows containing specific processes can be checked without checking these specific processes. This means that processes with their conditions yet to be defined may be left unchecked while only the processes of defined conditions are subject to process checks.

According to a tenth aspect of the present invention, process flows containing defects can be corrected through manual input. This makes it possible to execute process flow checks with ease to the end despite the presence of detected defects.

Further, the present invention is not limited to these embodiments, but variations and modifications maybe made without departing from the scope of the present invention.

The entire disclosure of Japanese Patent Application No. 2001-23178 filed on Jan. 31, 2001 including specification, claims, drawings and summary are incorporated herein by reference in its entirety.

What is claimed is:

1. A production management system for managing production of semiconductor devices, the system comprising:
   usage rule storing means for storing usage rules on containers for accommodating wafers with regard to individual processes included in a reviewable process flow; and
   reviewable process flow checking means for checking whether said reviewable process flow complies with said usage rules.

2. The production management system according to claim 1, further comprising:
   production line process flow storing means for storing a plurality of processes included in a production line process flow which is judged to comply with said usage rules; and
   usage rule supplying means for supplying said usage rules regarding said containers to either pieces of production equipment for executing the processes included in said production line process flow, or to devices installed close to said pieces of production equipment.

3. The production management system according to claim 2, further comprising usage rule displaying means for displaying said usage rules supplied by said usage rule supplying means for review to line operators in the vicinity of said pieces of production equipment.

4. The production management system according to claim 2, further comprising at least one of:

before-process container change prompting means for prompting a line operator to change containers before starting a process if said usage rules specify that a carry-in container be different from an in-process container; and after-process container change prompting means for prompting said line operator to change containers after a process if said usage rules specify that an in-process container be different from a carry-out container.

5. The production management system according to claim 2, further comprising:

processing condition storing means for storing processing conditions for each of the processes included in said production line process flow;

processing condition supplying means for supplying said processing conditions to either pieces of production equipment for executing the processes included in said production line process flow, or to devices installed close to said pieces of production equipment.

6. The production management system according to claim 5, further comprising processing condition displaying means for displaying said processing conditions supplied by said processing condition supplying means for review to line operators in the vicinity of said pieces of production equipment.

7. The production management system according to claim 1, wherein the processes constituting said reviewable process flow include a process in which wafers are transported into dedicated containers for processing; and wherein said reviewable process flow checking means checks whether said reviewable process flow meets said usage rules, while leaving said dedicated containers unchecked.

8. The production management system according to claim 7, wherein said dedicated containers include containers permitting processing by specific pieces of production equipment.

9. The production management system according to claim 7, wherein said dedicated containers include general-purpose containers which serve as temporarily dedicated containers for carrying in and out wafers into and from specific processes.

10. The production management system according to claim 1, further comprising recording means for recording nonreviewable processes which are included in said reviewable process flow but are exempt from checks;

wherein said reviewable process flow checking means checks whether said reviewable process flow meets said usage rules, while leaving said nonreviewable processes unchecked.

11. The production management system according to claim 1, wherein said reviewable process flow checking means includes:

defect displaying means for displaying defects which are detected in said reviewable process flow and which fail to comply with said usage rules;

correcting means for having said defects corrected through manual input; and check resuming means for resuming the checks following said correction.

* * * * *